United States Patent [19]

Lian et al.

[11] Patent Number: 5,773,069
[45] Date of Patent: Jun. 30, 1998

[54] PREPARATION OF INSTANT GLASS NOODLES

[75] Inventors: Hwee Peng Rebecca Lian; Tian Seng Toh, both of Singapore, Singapore

[73] Assignee: Nestec S.A., Vevey, Switzerland

[21] Appl. No.: 635,377

[22] Filed: Apr. 19, 1996

[30] Foreign Application Priority Data

Apr. 22, 1995 [SG] Singapore .......................... 9500310-9

[51] Int. Cl.$^6$ ........................................... A23L 1/16
[52] U.S. Cl. .......................... 426/557; 426/451; 426/516
[58] Field of Search .................................. 426/557, 451, 426/516, 508, 511, 510

[56] References Cited

U.S. PATENT DOCUMENTS

| | | |
|---|---|---|
| 3,537,862 | 11/1970 | Peters et al. . |
| 3,836,680 | 9/1974 | Salza . |
| 4,517,215 | 5/1985 | Hsu . |
| 4,675,199 | 6/1987 | Hsu et al. . |
| 4,828,852 | 5/1989 | Hsu et al. . |
| 4,830,867 | 5/1989 | Uemura et al. . |
| 4,871,572 | 10/1989 | Chiu et al. . |
| 4,876,104 | 10/1989 | McGuire et al. . |
| 4,960,604 | 10/1990 | Chiu et al. . |
| 5,211,977 | 5/1993 | Hauser et al. . |
| 5,256,435 | 10/1993 | Cuperus . |

FOREIGN PATENT DOCUMENTS 1128257 9/1968 United Kingdom .

OTHER PUBLICATIONS

Abstract No. 55–165774, Eiji Takahashi, Mar. 1981.
Mercier et al, Ed., Pasta and Extrusion Cooked Foods, Elsevier Applied Science Publishers London and New York, 1986, pp. 55–59.
Galvez et al., "Process Variables, Gelatinized Starch and Moisture Effects on Physical Properties of Mung Bean Noodles", Journal of Food Science vol. 59, No. 2, 1994.
Derwent Publications, Ltd., Database Abstract WPI Accession No. 90–288207, Abstract of Korean Patent Document 8 903 737B (1989).

*Primary Examiner*—Lien Tran
*Attorney, Agent, or Firm*—Vogt & O'Donnell, LLP

[57] ABSTRACT

Instant glass noodles are prepared with mung bean starch or potato starch or mixtures thereof. To prepare the noodles, raw mung bean and/or potato starch and water are mixed at a temperature and for a time to form a dough and to gelatinize the starch partially, and the dough is extruded to obtain the dough in a noodle form. The noodles then are steamed to firm them, then blanched to gelatinize the starch further and then chilled in water to allow starch retrogradation to stiffen them, and then the noodles are dried to a moisture content below 15%.

19 Claims, No Drawings

5,773,069

PREPARATION OF INSTANT GLASS NOODLES

FIELD OF THE INVENTION

The present invention relates to preparation of noodles, more particularly to the preparation of instant glass, cellophane or transparent noodles which, for the sake of convenience, are hereinafter be referred to as instant glass noodles.

BACKGROUND OF THE INVENTION

The traditional process for preparing glass noodles is from mung beans and involves a first cooking step of the dough to partially gelatinise the mung bean starch, mixing, kneading and extruding the dough, a second cooking step to complete the starch gelatinisation, followed by draining, cooling and freezing for 24–28 hours to allow starch retrogradation and finally drying.

U.S. Pat. No. 4,830,867 describes and claims a process for producing a transparent pasta sheet wrapped around a filling which comprises adding water to a starting mixture comprising raw starch:α-potato starch in a weight ratio of about 95:5 to about 35:65, kneading the moistened mixture to form a dough, thereafter extending the dough to produce a transparent pasta sheet and wrapping the sheet around a filling. There is no mention of instant noodles nor a dehydrated product.

U.S. Pat. No. 4,871,572 describes and claims an extruded oriental noodle, consisting essentially of a starch and water, characterized in that the starch used in the preparation of the noodle is a mixture of mung bean starch and a granular crosslinked potato starch or a granular crosslinked sweet potato starch, the granular potato starch being crosslinked sufficiently to have a sediment volume of about 2–16 ml and the sweet potato starch being crosslinked to have a sediment volume of about 2–6 ml. The only process described in this patent for preparing the oriental noodles involves freezing and thawing stages before air drying. There is no mention of instant noodles.

SUMMARY OF THE INVENTION

We have devised a process for the preparation of instant glass noodles from raw mung bean starch or raw potato starch which requires no cooking, freezing or thawing stages. Cross-linked or alpha-starches are unnecessary.

According to the present invention, there is provided a process for the preparation of an instant glass noodle which comprises a) preparing a dough from raw mung bean starch or raw potato starch or any mixture thereof by adding hot water and mixing to partially pregelatinise the starch, b) extruding the dough to form the noodles, c) steaming the noodles, d) blanching the steamed noodles with hot water, e) chilling the blanched noodles in chilled water to allow starch retrogradation, and f) drying the noodles to a moisture content below 15%.

In practice of the present invention, it will be found that mung bean starch imparts a more crunchy noodle bite while potato starch imparts a more elastic noodle bite.

DETAILED DESCRIPTION OF THE INVENTION

In carrying out the process of the present invention, amount of hot water added to the starch may conveniently be from 20 to 60% by weight, preferably from 30 to 50% by weight and more preferably from 35 to 45% by weight based on the total weight of the dough formed. The temperature of the hot water may be from 80° C. to boiling, preferably from 85° to 100° C. and especially from 90° C. to 98° C. The duration of the mixing of the hot water with the starch may be, for example, from 2 to 30 minutes, preferably from 5 to 20 minutes and more preferably from 10 to 15 minutes. The admixture with hot water should pregelatinise some, but not all, of the starch, e.g. from 5% to 30%, preferably from 10% to 20%. The partial pregelatinisation provides binding for good processability.

The extrusion of the dough to form the noodle may be carried out in a ram extruder or a double-screw extruder, but is preferably carried out in a single-screw extruder. The diameter of the nozzle may be, for example, from 0.25 to 1.5 mm and preferably from 0.5 to 1.0 mm and especially from 0.7 to 0.9 mm.

Preferably, after extrusion, the noodle is portioned and formed into a nest or cake. The portioning involves cutting the noodle into strips or strands having a length of from about 7 cm up to 40 cm or more. The portioned strands may be formed into a nest by folding and inter-twining a plurality of strands into either a roughly spherical shape somewhat similar to a bird's nest, or into a roughly square shape to form a cake. The weight of the nest or cake may be from 15 to 100 g, more usually from 20 to 80 g, for example from 25 to 65 g. The volume of the nest or cake may be from about 50 cm$^3$ to about 270 cm$^3$.

The steaming of the noodles is performed to firm up the surface and structure and may be carried out for a period of from 30 seconds to 25 minutes, preferably from 1 to 15 minutes and especially from 2 to 10 minutes. The temperature of the steam may be at least 85° C. and preferably from 90° to 100° C. Saturated steam or steam at atmospheric condition may conveniently be used, if desired. The blanching of the steamed noodles is carried out to complete or substantially complete the starch gelatinisation. The temperature of the hot water may be from 80° C. to boiling, preferably from 85° C. to 100° C. and especially from 90° C. to 98° C. The duration of the blanching may be from 1 to 60 seconds, preferably from 5 to 45 seconds and more preferably from 10 to 30 seconds.

The chilling of the blanched noodles is carried out to allow starch retrogradation. Retrogradation allows the noodle strands to become stiffer, to facilitate the operation of strand loosening to prevent them from sticking together before drying, as well as to create a desirable rigid or rubbery texture to the final product. The chilling is performed with chilled water which may be from just above freezing point to 15° C, for instance from 1° to 12° C. and preferably from 2° to 10° C. The duration of the chilling may be from 10 seconds to 5 minutes, preferably from 30 seconds to 3 minutes and more preferably from 1 to 2 minutes.

After chilling, excess water may be drained away, e.g. by sieving, vibrating or air blowing.

Finally the chilled noodles are dried to give the instant glass noodles preferably to a moisture content of 3 to 13% by weight, e.g. from 5 to 10% by weight. The drying may be carried out by any conventional method, e.g. a heated drum, an oven, an infrared tunnel, a microwave oven, a dielectric heater or more conveniently, by hot air. The drying temperature may be from 50° C. to 100° C., preferably from 55° to 90° C. and especially from 60° to 80° C. The duration of the drying may be from 5 minutes to 5 hours, preferably from 1 to 3 hours, longer periods of time usually being required at lower temperatures.

The instant glass noodles prepared according to this invention may be reconstituted for consumption by placing them in boiling water and continuing to boil for from 1 to 5 minutes, preferably from 2 to 3 minutes. They may also be reconstituted for consumption in a microwave oven by adding them to an appropriate amount of water, e.g. cold tap water at 20° to 25° C. and heating at high power from 3 to 6 minutes, preferably 4 to 5 minutes, or boiling water and heating at high power from 1 to 4 minutes, preferably 2–3 minutes. In addition, the instant glass noodles may be reconstituted for consumption by standing in water that has already been boiled, but with the heat turned off, except that the time required for rehydration may be longer, e.g. 10–15 minutes.

EXAMPLES

The following Examples further illustrate the present invention.

EXAMPLE 1

60 parts of raw mung bean starch is mixed with 40 parts of water at 95° C. for 15 minutes to give a dough in which the starch is partially pregelatinised. The dough is formed into noodle shape by extruding through a single-screw extruder whose die nozzle diameter is 0.8 mm. The extruded noodle is then portioned into strands having a length of 30 cm and then a plurality of strands are folded and inter-twined to form a nest having a weight of 50 g and a volume of 250 cm$^3$. The nest is steamed for 5 minutes with steam at a temperature of 95° C. and then blanched with water at 95° C. for 20 seconds to complete the starch gelatinisation.

After blanching, the nest is chilled for 1.5 minutes in water at 5° C. to allow starch retrogradation. Excess water is drained off by means of a sieve and the nest is finally dried in an oven at 70° C. for 2 hours to give the instant glass noodles having a moisture content of 8%.

On reconstitution for consumption by boiling in water for 2 minutes, the glass noodles have a desirable crunchy bite.

EXAMPLE 2

A similar procedure to that described in Example 1 is followed but using, instead of the mung bean starch, raw potato starch. On reconstitution for consumption, the glass noodles have a desirable elastic bite.

EXAMPLES 3 to 5

A similar procedure to that described in Example 1 is followed but using, instead of the mung bean starch, mixtures of raw mung bean starch and raw potato starch in the proportions shown in Table 1. On reconstitution for consumption, the organoleptic properties are as indicated in Table 1.

TABLE 1

| EXAMPLE | RATIO OF MUNG BEAN STARCH TO POTATO STARCH | ORGANOLEPTIC PROPERTIES |
| --- | --- | --- |
| 3 | 75:25 | more crunchy bite |
| 4 | 50:50 | well balanced bite |
| 5 | 25:75 | more elastic bite |

We claim:

1. A process for preparing an instant glass noodle comprising:
   mixing water and a starch selected from the group consisting of raw mung bean starch, raw potato starch and mixtures thereof in amounts and at a temperature and for a time to form a dough and to gelatinize the starch partially, for binding the dough, and extruding the dough to obtain the dough in a form of noodles;
   steaming the dough noodles with steam having a temperature of from 85° C. to 100° C. for from 30 seconds to 25 minutes to firm the noodles to obtain firmed noodles;
   blanching the firmed noodles with water at a temperature and for time to gelatinize the starch further to obtain blanched noodles;
   chilling the blanched noodles with water at a temperature and for a time to allow starch retrogradation to stiffen the blanched noodles to obtain stiffened noodles; and
   drying the stiffened noodles to obtain dried noodles having a moisture content of less than 15%.

2. A process according to claim 1 wherein the water and starch are mixed so that, by weight based upon dough weight, the water is in an amount of from 20% to 60% and wherein the water and starch are mixed at a temperature and for a time so that from 5% to 30% of the dough starch is gelatinized.

3. A process according to claim 1 or 2 wherein the water and starch are mixed at a temperature and for a time so that from 10% to 20% of the dough starch is gelatinized.

4. A process according to claim 3 wherein the water and starch are mixed so that the dough comprises the water in an amount of from 30% to 50%.

5. A process according to claim 1 or 2 wherein the firmed noodles are blanched so that at least substantially all of the starch comprising the blanched noodles is gelatinized.

6. A process according to claim 1 or 2 wherein the blanched noodles are chilled with water having a temperature of from above 0° C. and to 15° C.

7. A process according to claim 6 wherein the blanched noodles are chilled for from 10 seconds to 5 minutes.

8. A process according to claim 4 wherein the firmed noodles are blanched so that at least substantially all of the starch comprising the blanched noodles is gelatinized.

9. A process according to claim 8 wherein the blanched noodles are chilled in water having a temperature of from above 0° C. and to 15° C.

10. A process according to claim 9 wherein the blanched noodles are chilled for from 10 seconds to 5 minutes.

11. A process according to claim 1 wherein the firmed noodles are blanched with water having a temperature of from 80° C. to 100° C. for from 1 second to 60 seconds and wherein the blanched noodles are chilled in water having a temperature of from above 0° C. and to 15° C.

12. A process according to claim 11 wherein the water and starch are mixed in amounts and at a temperature and for a time so that from 5% to 30% of the dough starch is gelatinized.

13. A process according to claim 12 wherein the water and starch are mixed so that the dough comprises the water in an amount of from 30% to 50%.

14. A process according to claim 11 wherein the water and starch are mixed at a temperature of from 80° C. to 100° C. for from 2 minutes to 30 minutes.

15. A process according to claim 14 wherein the blanched noodles are chilled for from 10 seconds to 5 minutes.

16. A process according to claim 1 or 15 wherein the noodles are steamed for from 1 minute to 15 minutes.

17. A process according to claim 1 wherein the stiffened noodles are dried at a temperature of from 50° C. to 100° C. for a period from 5 minutes to 5 hours.

18. A process according to claim 1 further comprising, prior to steaming the noodles, forming the noodles into a nest and then steaming the nest noodles.

19. A process according to claim 1 further comprising, prior to steaming the noodles, forming the noodles into a cake and then steaming the cake noodles.

* * * * *